E. HILTON AND A. GIRODAT.
PISTON CONNECTION.
APPLICATION FILED NOV. 26, 1919.

1,386,254.

Patented Aug. 2, 1921.

Inventors
Einar Hilton
Aaron Girodat

By Lancaster and Allwine
their Attorneys

UNITED STATES PATENT OFFICE.

EINAR HILTON AND AARON GIRODAT, OF GULL LAKE, SASKATCHEWAN, CANADA.

PISTON CONNECTION.

1,386,254.  Specification of Letters Patent.  Patented Aug. 2, 1921.

Application filed November 26, 1919. Serial No. 340,760.

*To all whom it may concern:*

Be it known that we, EINAR HILTON and AARON GIRODAT, subjects of the King of Great Britain, residing at Gull Lake, in the Province of Saskatchewan and Dominion of Canada, have invented certain new and useful Improvements in Piston Connections, of which the following is a specification.

This invention relates to pistons, and more particularly to a connection between the pistons and coupling rod, an object of the invention being to provide a coupling by means of which the piston may be quickly and easily connected to a coupling or connecting rod, one which will eliminate cutting or wear upon the piston, as resides in the use of ordinary approved type of cross head pins, and further to provide a connection, which is constructed to always maintain a relatively tight and firm connection between the piston and coupling eliminating the working loose of any of these members during continuous use.

More specifically, the invention comprehends the provision of a piston having a pair of diametrically opposed truncated cones formed upon its inner wall and extending toward the central longitudinal axis of the piston, which members have wear facings preferably of brass or analogous metal about their outer surfaces, and which truncated conical members coact with the coupling section, for connecting the piston to the connecting rod of an engine, pump or analogous structure. This connection comprises an outer and inner member, which inner member is slidably supported with respect to the outer member for adjusted movement with respect thereto, the outer member being detachably connected to a connecting rod, and the inner member being adjusted upon the outer member to securely clamp the members in engagement with the truncated cone carried by the piston to form secure connection between the piston and connecting rod.

Figure 1:
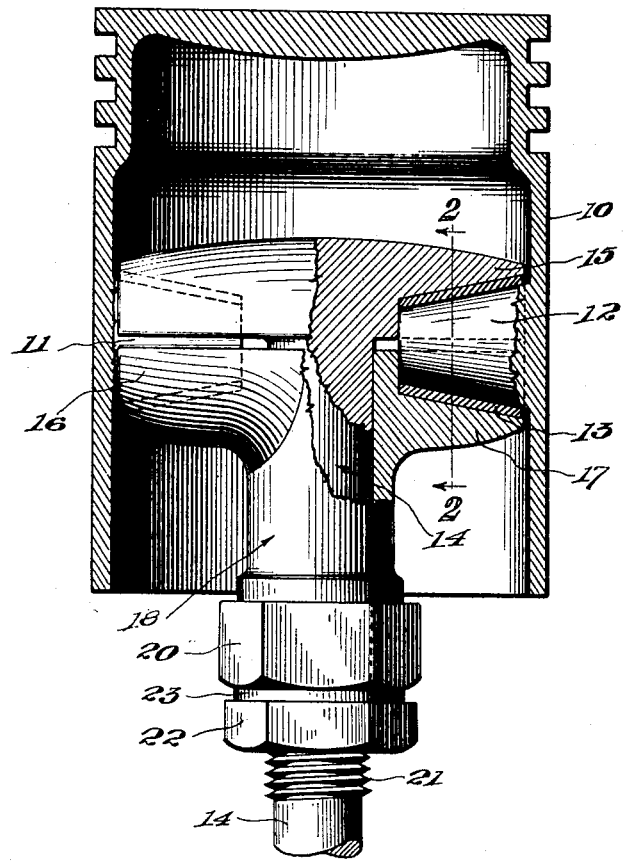
Figure 2:
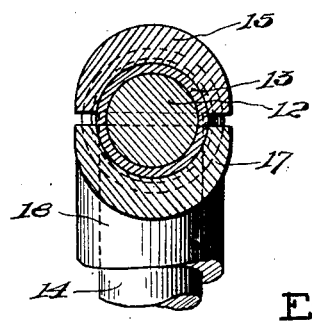

Other objects of the invention will appear in the following detailed description taken in connection with the accompanying drawings, forming a part of this specification, and in which drawings:

Figure 1 is a section through the piston showing the improved connection applied thereto, and illustrating parts of the connection in section, and Fig. 2 is a section on the line 2—2 of Fig. 1.

Referring more particularly to the drawings, the piston 10 is of any approved exterior construction, and it has a pair of inwardly extending diametrically opposed substantially frusto conical shaped projections 11 and 12 formed upon its inner surface and extending inwardly toward the longitudinal axis of the piston. These projections or lugs 11 and 12 have tapered bearings or bushings 13 mounted about their outer surfaces, to pick up wear occasioned by the continuous use of the piston structure.

The connecting rod 14, has a cross head 15, formed upon its outer end, and this cross head is provided with recesses in its outer surface, which engage over the lugs 11 and 12, as clearly shown in Fig. 1 of the drawings. The head 15 co-acts with the transverse or lateral projections 16 and 17 formed upon the cross head bearing 18 which is slidably mounted upon the connecting rod 14. These lateral extensions 16 and 17 are provided with recesses for receiving therein portions of the lugs or projections 11 and 12. The outer end of the tubular portion of the cross head bearing 18 engages against the nut 20 which is threaded upon the threaded portion 21 of the connecting rod 14, and by adjustment of the nut 20 the cross head bearing 18 is forced toward the cross head 15 formed upon the connecting rod 14, for securely clamping the lateral extensions 16 and 17 and the cross head 15 in firm engagement with the lugs or projections 11 and 12 to establish a firm connection between the piston 10 and the connecting rod 14, which connection may be easily broken by adjustment of the nut 20 away from said piston 10 to permit loosening of the clamped engagement of the bearing and cross head 15 with the lugs or projections 11 and 12. The lock nut 22 is mounted upon the threaded portion 21 and is held spaced from a nut 20 by a facing washer 23. In case the connection becomes loose by wear during continuous use, the nut 20 may be adjusted upon the coupling rod 14 for forcing the cross head bearing 18 inwardly, and consequently drawing the head 15 outwardly or rather moving these members toward each other, maintaining a firm engagement with the bearing bushings 13, and this tightening movement also will tighten the bushings 14, in place, thereby eliminating any play between the respective parts of the coupling structure and the piston.

In assemblying, the connecting rod 14 is turned so that the cross head bearing will extend at right angles to the lugs or projections 11 and 12, and it is passed between the facing ends of these lugs or projections after which it is turned a quarter turn, so as to cause the head 15 to extend parallel with the lugs, and when it is drawn outwardly the recesses in the outer surface of the cross head will engage over the upper portions of the bushings 13.

Changes in details may be made without departing from the spirit of this invention, but;

We claim:

1. In a piston connection, the combination with a piston, of a pair of lugs carried by the piston and extending thereinto, a connecting rod, means rigidly carried by said connecting rod and adapted for engagement with said lugs, means adjustably carried by said connecting rod for engagement with said lugs, and means for clamping said rigid and adjustable means into binding engagement with said lugs.

2. In a piston connection, the combination with a piston, of a pair of lugs carried by the piston and extending thereinto, a connecting rod, a cross head upon said connecting rod, a cross head bearing slidably carried by the connecting rod, and means for forcing said cross head bearing and cross head into binding engagement with said lugs.

3. In a piston connection, the combination with a piston, of a pair of lugs carried by the piston and extending thereinto, a connecting rod, a cross head bearing upon said connecting rod, taper bearing bushing about said lugs, a cross head bearing slidably carried by said connecting rod, and means for forcing said cross head bearing into binding engagement with said lugs.

4. In a piston connection, the combination, with a piston, of a pair of substantially frusto-conical lugs formed integrally with the inner wall of the piston and projecting thereinto from diametrically opposed points, taper bearing bushings about said lugs, a connecting rod, means formed integrally with said connecting rod for engagement with said bushings, means adjustably carried by said connecting rod, for engagement with said bushings, and means upon said connecting rod for clamping said rigid and said adjustable means into binding engageemnt with the bushings and lugs.

5. In a piston connection, the combination with a piston, of a pair of substantially frusto-conical lugs formed integrally with the piston and extending thereinto from diametrically opposed points, a connecting rod, a cross head formed upon said connecting rod, said cross head provided with recesses adapted to snugly fit said lugs, a cross head bearing slidably carried by said piston rod and provided with recesses for snugly fitting about portions of said lugs, and means upon said connecting rod for forcing said cross head bearing and cross head into clamping engagement with said lugs.

6. In a piston connection, the combination with a piston, of a pair of lugs carried by the piston and extending thereinto from diametrically opposed points, a cross head provided with recesses adapted to engage over portions of said lugs, a cross head bearing slidable relative to said first named cross head, and means engaging said cross head bearing for clamping it and said cross head in binding engagement with said lugs.

7. In a piston connection, the combination with a piston, of a pair of substantially frusto-conical lugs carried thereby and extending into the piston from diametrically opposed points, a cross head provided with recesses adapted to fit over portions of said lugs, a cross head bearing slidably supported by said cross head and provided with recesses adapted to fit over portions of said lugs, means engaging said cross head bearings for forcing it and said cross head into binding engagement with said lugs, and means for locking said last named means against accidental movement.

8. In a piston connection, the combination with a piston, of a pair of substantially frusto-conical lugs carried thereby and extending into the piston from diametrically opposed points, a cross head provided with recesses adapted to fit over portions of said lugs, a cross head bearing slidably supported by said cross head and provided with recesses adapted to fit over portions of said lugs, means engaging said cross head bearings for forcing it and said cross head into binding engagement with said lugs, means for locking said last named means against accidental movement, and tapered bearing bushings mounted about said lugs.

9. In a piston connection, the combination with a piston, of bearing members carried by the opposite sides of the piston, a piston rod, and sectional means carried by the piston rod for engaging said bearing members.

10. In a piston connection, the combination with a piston, of a pair of diametrically opposed bearing lugs carried by the piston, and a pair of independent and adjustable members carried by the piston rod for engaging the upper and lower surfaces of the lugs.

11. In a piston connection, the combination with a piston body, of diametrically opposite bearing members carried by the inner surface of the body, a piston rod, and means carried by the piston rod for engaging said bearing members.

EINAR HILTON.
AARON GIRODAT.